WOVEN TYPE, SEMIFIXED MEMORY DEVICE

Filed Feb. 28, 1966

INVENTORS
HISAO MAEDA
BY AKIRA MATSUSHITA

H. Edward Mestern

INVENTORS
HISAO MAEDA
AKIRA MATSUSHITA
BY
H. Edward Mestern

United States Patent Office 3,425,042
Patented Jan. 28, 1969

3,425,042

WOVEN TYPE, SEMIFIXED MEMORY DEVICE

Hisao Maeda, Ota-ku, Tokyo-to, and Akira Matsushita, Kitatama-gun, Tokyo-to, Japan, assignors to Toko Kabushiki Kaisha, Tokyo-to, Japan, a joint-stock company of Japan Filed Feb. 28, 1966, Ser. No. 530,644
Claims priority, application Japan, Mar. 1, 1965, 40/11,750
U.S. Cl. 340—174 2 Claims
Int. Cl. G11b 5/00

This invention relates to memory devices of the woven matrix type wherein numerous sense lines and word lines are woven as weft and warp members, respectively, into a fabric structure.

More specifically, it is an object of the present invention to provide a semifixed memory device of the woven type referred to above of simple construction and operation and low manufacturing cost.

According to the present invention, briefly stated, there is provided a semifixed memory device wherein a woven memory matrix of the above stated character, in which the sense lines are magnetic wires magnetized in the wire circumferential direction, is mounted on a support plate, and readily attachable and detachable means constituting short-circuiting rings (hereinafter referred to as "short rings") are secured around sense lines at only selected crossings of word lines and sense lines thereby to diminish, at only these selected crossings, outputs induced in the respective sense lines by deflection of magnetization direction of the sense lines due to a read-out current passed through the respective word lines.

Accordingly, information content of "1" or "0" can be stored at will in any of the numerous crossings and read out any number of times by merely passing a read-out current through the pertinent word lines. Moreover, the positions of the short rings can be changed as desired in a relatively simple manner.

The nature, principle, and details of the present invention will be more clearly apparent from the following detailed description when taken in conjunction with the accompanying drawings in which like parts are designated by like reference numerals and characters.

Figure 1:
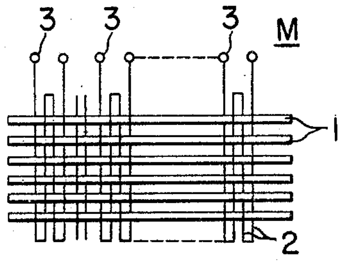
FIG. 1 is a schematic planar view showing the woven state of a woven type memory device.

Referring to FIG. 1, the woven memory matrix schematically shown therein is a woven fabric structure comprising weft members of magnetic thin film wire consisting of a conductor core wire such as cooper wire coated with a film of a ferromagnetic material such as a permalloy or a very fine wire made of a magnetic material (this magnetic thin film wire being hereinafter referred to generally as a magnetic wire 1) and warp members of a conductor wire 2 woven with the weft magnetic wires 1 in perpendicular disposition relative thereto and in a manner to surround the weft magnetic wires 1 while the magnetic wires 1 are sustained in a straight state. After the fabric structure has been woven, the ends of groups of adjacent warp members 2 are interconnected to form word lines 3 constituting coils of a desired number of turns per section of the weft wire.

The magnetic wire 1 is initially, magnetized beforehand in the wire circumferential direction or is forcibly magnetized in the circumferential direction by passing a direct current therethrough, and numerous lengths thereof are used as sense lines. These sense lines 1 and the word lines 3 are, of course, insulated from each other.

When a read-out current is passed through a certain word line, the magnetization direction of the sense line at the crossing point (hereinafter referred to as a "bit") of the word line and a sense line is deflected toward the wire axial direction of the sense line. This deflection causes an output voltage to be induced in said sense line.

Figure 2:
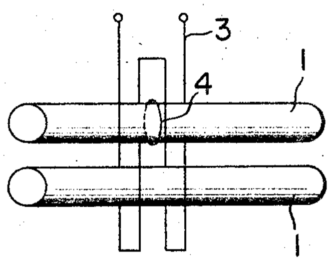
FIG. 2 is a schematic view for an explanation of the principle of the semifixed memory device of the invention.

However, if a short ring 4 is established around a sense line at a position of coupling with a word line as indicated in FIG. 2, a countercurrent will flow in the short ring 4 and cancel the effect of the read-out current. Consequently, the output at said bit will become extremely small relative to the ouptuts at the other bits.

Therefore, if specific bits where the outputs are to be rendered zero or of low magnitude are selected beforehand and provided with short rings 4, bits of high and low outputs, respectively, with respect to a single word line are formed. Accordingly, by assuming that the bits of high output correspond to "1," and the bits of low output correspond to "0," and merely passing a read-out current through the pertinent word lines, information content of "1" or "0" can be readily read out any number of times, whereby a fixed memory device of extremely simple construction and low manufacturing cost can be produced.

The present invention accordingly contemplates the provision of a semifixed memory device of woven type so constructed and arranged that short rings can be readily and interchangeably established in desired bits, whereby the information content of "1" or "0" can be freely set in any of the desired bits.

Figure 3:
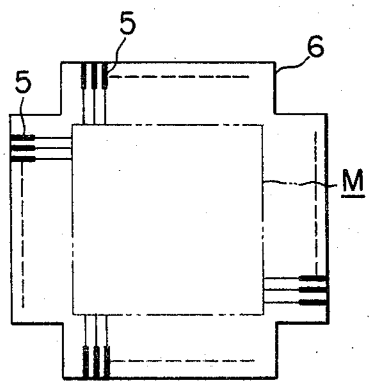
FIG. 3 is a schematic planar view showing a memory support plate according to the invention.

In a preferred embodiment of the present invention, the memory matrix M shown in FIG. 1 is mounted on a support plate 6 made of an insulating material and having a large number of terminals 5 around the periphery thereof as shown in FIG. 3, and the ends of all word lines and sense lines are fixed by connecting them to respective terminals 5. A part of the support plate 6 shown in FIG. 3 is shown in enlarged view in FIG. 4.

Figure 4:
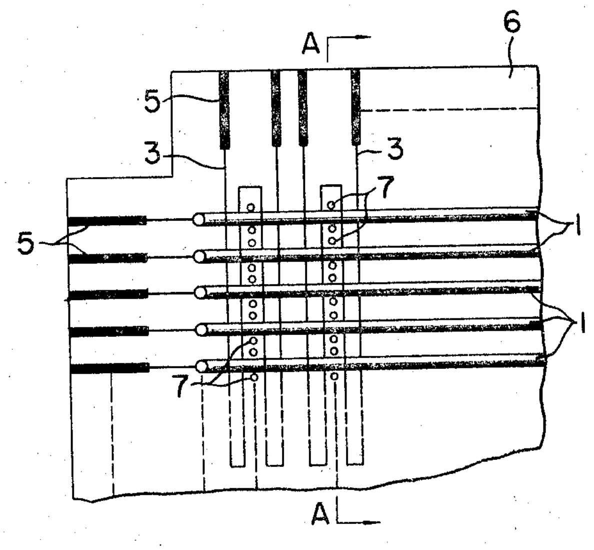
FIG. 4 is an enlarged fragmentary view showing one part of the plate shown in FIG. 3.

According to the present invention, small diameter through holes 7 are formed in the support plate 6 at positions affording good coupling with each word line 3 as shown in FIG. 4. A feature of the invention is that conductor wires for short-circuiting are inserted into these holes in a manner to straddle magnetic wires 7, and the two ends of each conductor wire are short-circuited to form a short ring 4. Each short ring 4 is, of course, insulated. Various modes of forming these short rings are possible, as described hereinafter with certain examples as illustrated in FIGS. 5 through 9, inclusive, each of which is a fragmentary sectional view taken along the plane indicated by line A—A in FIG. 4.

Figure 5:
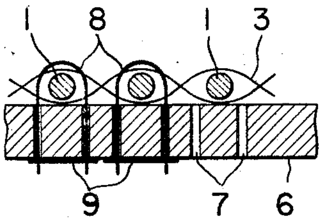
FIGS. 5 through 9, inclusive, are fragmentary sectional views each taken along the plane indicated by line A—A in FIG. 4 and showing *a* an example of construc-of a short ring.

In the example shown in FIG. 5, a U-shaped piece of conductor wire is used for the short-circuiting wire 8. This wire 8 is caused to straddle a magnetic wire 1, and the two ends of the wire 8 are inserted through respective small holes 7 and are soldered to a ground plate 9 bonded onto the reverse side of the support plate 6. A short ring is thus formed around the magnetic wire 1.

When there is no ground plate 9 on the reverse side of the support plate 6, the two ends of the conductor wire 8 may be bridged by a body of solder 10 as shown in FIG. 6*a* or twisted together and then soldered as shown in FIG. 6*b*.

Figure 6:
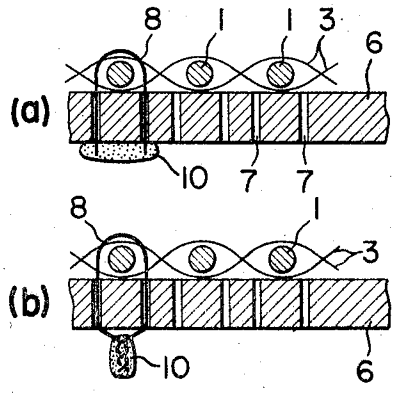

In either of the examples shown in FIGS 5 and 6, the U-shaped conductor wire 8 can be readily extracted by unsoldering or by cutting the soldered joint on the reverse side of the support plate 6.

Figure 7:
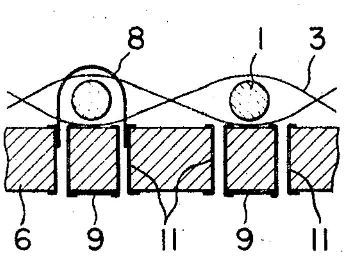

In the example shown in FIG. 7, fine bore metal tubes 11 (complete tubes or those slit axially) are inserted beforehand through the small holes 7 and their ends are headed and secured to a ground plate 9 on the reverse side of the support plate 6. Then the ends of an elastic, U-shaped short-circuiting wire 8 caused to straddle the magnetic wire 1 are inserted into these tubes 11.

In this case, the U-shaped wire 8 is previously formed with a natural spread between its ends which is somewhat greater than the distance between the pair of tubes 11, so that when the ends of this wire 8 are inserted into the tubes 11, they are elastically forced inwardly toward each other and, reactively, exert an outward force against the inner walls of the tubes 11. Accordingly, good contact is established between the ends of the wire 8 and the tubes, and soldering is unnecessary. As a result, interchangeable insertion and extraction of the short-circuiting wire 8 is greatly facilitated.

Figure 8:
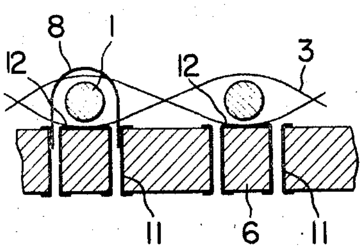

Alternatively, the above described metal tubes 11 may be headed and secured to a metal sheet 12 bonded to the front surface of the support plate 6 as shown in FIG. 8.

Figure 9:
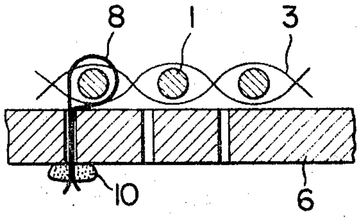

While, in the foregoing examples, the small holes are formed on both sides of the magnetic wire, it is also possible to insert the two ends of a wire 8 surrounding the magnetic wire 1 through a single small hole 7 and to solder and anchor the ends as indicated in FIG. 9.

By the above described construction and arrangement of the memory device according to the invention, the short rings can be made freely attachable and detachable at any of the bits of the memory device, and, therefore, information content of "1" or "0" can be set selectively in any of the bits.

An additional advantage of the memory device of the invention is that, by the manner in which the short rings are secured, the entire memory is stably held against the support plate 6.

It should be understood, of course, that the foregoing disclosure relates to only a preferred embodiment of the invention and a few modifications thereof and that it is intended to cover all changes and modifications of the examples of the invention herein chosen for the purposes of the disclosure, which do not constitute departures from the spirit and scope of the invention as set forth in the appended claims.

What we claim is:

1. A semifixed memory device of woven type comprising: a woven memory matrix comprising numerous magnetic wires in the weft direction and numerous word lines in the warp direction woven into a fabric structure having numerous crossings of magnetic wires and word lines, the magnetic wires being magnetized in the wire circumferential direction and used as sense lines, means for passing read-out current through the word lines, and means to lead out from the sense lines outputs induced therein by deflection of magnetization direction due to passage of said read-out current; a support plate on which the woven memory matrix is supported and secured, and in which small holes are formed at all positions where good coupling with the word lines can be achieved; and pieces of conductor wire each straddling and surrounding the magnetic wire only a number of selected crossings among said crossings, the two ends of each piece of conductor wire being passed through at least one of the small holes and short-circuited in a readily detachable manner, whereby a short ring is formed around the magnetic wire, the short rings thus formed thereby functioning to diminish said outputs at only said selected crossings.

2. A semifixed memory device of woven type comprising: a woven memory matrix comprising numerous magnetic wires in the weft direction and numerous word lines in the warp direction woven into a fabric structure having numerous crossings of magnetic wires and word lines, the magnetic wires being magnetized in the wire circumferential direction and used as sense lines, means for passing read-out current through the word lines, and means to lead out from the sense lines outputs induced therein by deflection of magnetization direction due to passage of said read-out current; a support plate on which the woven memory matrix is supported and secured, and in which pairs of small holes are formed at all positions where good coupling with the word lines can be achieved, the holes of each pair being on the two sides of a magnetic wire; metal pipes each fitted into one of the small holes, the metal pipes of each of said pairs of holes being connected by a metal member secured to the support plate; and elastic, U-shaped conductor wires each disposed to straddle the magnetic wire at one of only a number of selected crossings among said crossings, the two ends of each U-shaped conductor wire being inserted into respective tubes in a pair of small holes on the two sides of the magnetic wire thereby to form a short ring around the magnetic wire, the short rings thus formed thereby functioning to diminish said outputs at only said selected crossings.

References Cited

UNITED STATES PATENTS

| | | | |
|---|---|---|---|
| 2,939,117 | 5/1960 | Brown | 340—174 |
| 3,290,512 | 12/1966 | Tillman et al. | 307—88 |

FOREIGN PATENTS

| | | |
|---|---|---|
| 1,379,699 | 10/1964 | France. |

OTHER REFERENCES

RCA Technical Notes, "Magnetic Memory Unit," by Wentworth, RCA TN No. 507; March 1962; 340–174.

RCA Technical Notes, "Magnetic Memory System," by Wentworth, RCA TN No. 508; March 1962; 340–174.

STANLEY M. URYNOWICZ, *Primary Examiner.*